United States Patent
Kuntschar et al.

(10) Patent No.: US 12,337,864 B2
(45) Date of Patent: Jun. 24, 2025

(54) METHOD FOR STEERING A VEHICLE

(71) Applicant: Continental Autonomous Mobility Germany GmbH, Ingolstadt (DE)

(72) Inventors: Andreas Kuntschar, Frankfurt am Main (DE); Kai Landfried, Bad Soden am Taunus (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 112 days.

(21) Appl. No.: 17/905,584

(22) PCT Filed: Feb. 23, 2021

(86) PCT No.: PCT/DE2021/200021
§ 371 (c)(1),
(2) Date: Sep. 2, 2022

(87) PCT Pub. No.: WO2021/175384
PCT Pub. Date: Sep. 10, 2021

(65) Prior Publication Data
US 2023/0174096 A1 Jun. 8, 2023

(30) Foreign Application Priority Data
Mar. 4, 2020 (DE) ...................... 10 2020 202 758.7

(51) Int. Cl.
*B60W 60/00* (2020.01)
*B60W 10/06* (2006.01)
*B60W 10/18* (2012.01)

(52) U.S. Cl.
CPC .......... *B60W 60/001* (2020.02); *B60W 10/06* (2013.01); *B60W 10/18* (2013.01);
(Continued)

(58) Field of Classification Search
CPC ... G05D 1/0212; B60W 10/06; B60W 60/001
(Continued)

(56) References Cited

U.S. PATENT DOCUMENTS

| 2004/0034460 A1 | 2/2004 | Folkerts et al. |
| 2016/0257197 A1 | 9/2016 | Fader et al. |

(Continued)

FOREIGN PATENT DOCUMENTS

| CN | 109715453 A | 5/2019 |
| CN | 110187639 A | 8/2019 |

(Continued)

OTHER PUBLICATIONS

Notice of Reasons for Refusal drafted Sep. 21, 2023 for the counterpart Japanese Patent Application No. 2022-547775 and translation of same.

(Continued)

*Primary Examiner* — Todd Melton
*Assistant Examiner* — Vincent Feng

(57) ABSTRACT

A method for controlling a vehicle including an actuator along a trajectory, in which the trajectory is planned within a search space, and considers a projection of a manipulated variable of the actuator. The method includes creating an actuator model of the actuator on the basis of the manipulated variable of the actuator; defining time increments of the projection; determining the change in the manipulated variable of the actuator along the time increments on the basis of the actuator model and a limit value for the manipulated variable; limiting the search space on the basis of the limit value of the manipulated variable of the actuator; determining an acceleration value and/or a deceleration value of the vehicle by converting the manipulated variable using the vehicle mass and the wheel radius; and outputting (Continued)

the acceleration value and the deceleration value to limit the search space within which the trajectory is planned.

18 Claims, 2 Drawing Sheets

(52) U.S. Cl.
CPC . *B60W 2420/403* (2013.01); *B60W 2420/408* (2024.01); *B60W 2420/54* (2013.01); *B60W 2520/00* (2013.01); *B60W 2710/0666* (2013.01); *B60W 2710/18* (2013.01)

(58) Field of Classification Search
USPC .......................................................... 701/23
See application file for complete search history.

(56) References Cited

U.S. PATENT DOCUMENTS

| | | | |
|---|---|---|---|
| 2019/0024595 | A1 | 1/2019 | Soliman |
| 2020/0306966 | A1* | 10/2020 | Falkenhahn ....... G05B 19/0426 |

FOREIGN PATENT DOCUMENTS

| | | | | |
|---|---|---|---|---|
| CN | 110271556 | A | 9/2019 | |
| DE | 102012001405 | A1 | 11/2012 | |
| DE | 102016103635 | A1 | 9/2016 | |
| DE | 102015209066 | A1 | 11/2016 | |
| DE | 102016221723 | A1 | 5/2017 | |
| DE | 102017114731 | A1 | 1/2019 | |
| DE | 102017213650 | A1 | 1/2019 | |
| DE | 102018203617 | A1 * | 9/2019 | ............ B60W 30/02 |

OTHER PUBLICATIONS

German Search Report dated for Nov. 24, 2022 the counterpart German Patent Application No. 10 2020 202 758.7.
The International Search Report and the Written Opinion of the International Searching Authority mailed on May 10, 2021 for the counterpart PCT Application No. PCT/DE2021/200021.
Yangeng Cong et al., "Motion Planning for an Autonomous Vehicle Driving on Motorways by Using Flatness Properties", 2010, IEEE, International Conference on Control Applications (CCA), Part of 2010 IEEE Multi-Conference Systems and Control Yokohama, Japan, Sep. 8-10, 2010, pp. 908-913; XP031781947, ISBN 978-1-4244-5362-7, S. 911.
Vasundhara Jain et al, "Reacting to Multi Obstacle Emergency Scenarios Using Linear Time Variying Model Predictive Control", 2019 IEEE Intelligent Vehicles Symposium (IV), pp. 1822-1829, XP033606041, DOI 10.1109/IVS.2019.8813982.
Notice of Reasons for Refusal drafted Feb. 19, 2024 for the counterpart Japanese Patent Application No. 2022-547775 and machine translation of same.
Chinese Office Action dated Mar. 6, 2025 for the counterpart Chinese Patent Application No. 202180018409.4 and machine translation of same.

* cited by examiner

METHOD FOR STEERING A VEHICLE

CROSS REFERENCE TO RELATED APPLICATIONS

The present application is a National Stage Application under 35 U.S.C. § 371 of International Patent Application No. PCT/DE2021/200021 filed on Feb. 23, 2021, and claims priority from German Patent Application No. 10 2020 202 758.7 filed on Mar. 4, 2020, in the German Patent and Trademark Office, the disclosures of which are herein incorporated by reference in their entireties.

TECHNICAL FIELD

The present invention relates to a method for trajectory planning for a vehicle, to a control system designed to carry out trajectory planning, to a computer program comprising program code for carrying out a method, and to a computer-readable storage medium which causes the computer on which the same is executed to carry out the method.

BACKGROUND

Modern vehicles, such as passenger vehicles, heavy goods vehicles or motorcycles, are increasingly being equipped with driver assistance systems which, by means of sensors, can detect the environment and objects located therein, identify traffic situations and assist the driver, e.g. by means of a braking and/or steering intervention or by outputting a visual or acoustic warning. Radar sensors, lidar sensors, camera sensors or the like are regularly used as sensors for detecting objects and/or the environment. Conclusions about the environment can subsequently be drawn from the sensor data measured by the sensors. The processed sensor information is used for detecting the environment in order to provide instructions for driver warning/information or for controlled steering, braking and acceleration on the basis of this information. Assistance functions that process the sensor and environment data can then be used, for example, to avoid accidents with other road users or to make it easier to perform complicated driving maneuvers by assisting with or even completely taking over the driving task or vehicle guidance (partially/fully automated). For example, the vehicle can be made to perform autonomous emergency braking (AEB, Automatic Emergency Brake) by means of an emergency brake assistance system (EBA, Emergency Brake Assist), to tail another vehicle and control speed by means of an adaptive cruise control assistance system (ACC), or to stay in lane by means of an active lane-keeping assistance system with steering assistance (LKA, Lane Keeping Assist). In addition, several of these functions can also be combined in one system. In addition to emergency braking in hazardous situations, automated braking intervention is particularly important in the case of (fully) automated guidance of a vehicle. Automated braking is initiated in a critical environment situation or traffic scene, in particular if a collision is imminent.

To control the (partially) automated driving, control systems are generally used which access actuators of the vehicle, e.g. steering system, brakes or engine, and comprise a trajectory planner ("planner" for short) for planning and selecting trajectories and one or more controllers for implementing the trajectory. The data flow to the controller is substantially along the "sense, plan, act" control chain, i.e. from left to right. Here, the planner primarily processes information from the sense part, i.e. the environment and object data acquired by environment sensors, such as distance and speed of the vehicle in front, but not information from the act part, such as current actuator states and actuator limits. Instead, the planner approach is usually based on the simplified idea that no actuator limits occur and the actuator dynamics are negligible. Realistically, a request to the actuator is implemented only after a certain actuator dead time (i.e., the period of time between the signal change at the system input and the signal response at the system output of the control chain), with dynamics that are inherent to the design and only within the actuator operating range. If this information is not available to the planner, this can lead to the planning of trajectories that cannot be driven. For example, trajectories are planned which cannot be implemented with the available actuator dynamics or are outside the operating range of the actuator. In these cases, both controller windup in the controllers downstream of the planning and re-planning can be triggered. The windup results from persistent control deviation and can, for example, lead to the planned distance to the vehicle ahead being undershot. During the transition from a decelerating trajectory to an accelerating trajectory (or vice versa), the windup leads to an additionally delayed vehicle reaction. Re-planning artificially reduces the control deviation, resulting in reduced accuracy. Persistent violation of the actuator limits may cause high-frequency re-planning and thus increasing drift between the necessary trajectory and the trajectory actually driven.

Engine and braking systems of the type in question do not usually provide feedback on actuator limits to the planner. However, if signals regarding actuator limits are available, they often only apply to the current calculation cycle. For example, an engine torque maximum and minimum (i.e., the maximum drag torque) are provided by the engine control unit, but without any indication of the time in which these maximum values can be reached. A prediction of the maximum torque gradient and thus the actual actuator potential is therefore not available. The planner calculates an optimal trajectory with a time projection. If limits are introduced by formulating constraints in the planner, the limits must be made available with a temporal projection. The limit provided by the engine control unit at the current time is not sufficient. Thus, no actuator limits can be considered in the planner, resulting in windup or re-planning.

Furthermore, apart from the absence of a prediction, the current engine torque limits are not used in the planner, although a planner is able, by means of optimization procedures, to consider limits in the form of constraints. The reason for this is that the actuator torque limit is not converted into a vehicle acceleration limit. However, the planner calculates an optimum trajectory on the basis of the longitudinal vehicle acceleration. If the actuator limits are only available as torques, the planner cannot use them because the planner does not include an actuator/vehicle model for converting torque to acceleration. Thus, no actuator limits can be considered in the planner.

DE 10 2016 221 723 A1 discloses a control system for a vehicle having multiple actuators (e.g., steering system, drive train, service brake and parking brake). The control system comprises a module for movement control of the vehicle, a module for actuator control, a module for specifying a vehicle operation strategy to be implemented, and a module for torque coordination, wherein a resulting normalized request vector having a longitudinal component, a lateral component, and a vertical component is formed from the movement requests on the vehicle. Furthermore, the control system is configured to form torques that are distributed to the actuators on the basis of the vehicle operation strategy and the request vector.

DE 10 2015 209 066 A1 describes a method for less complex trajectory planning for a vehicle, in which the search space for determining the trajectory is limited on the basis of an approximated end time. The search space for determining the trajectory for the driving maneuver is limited to a certain range around the approximated end time, in particular by 10% around the approximated end time, in order to reduce the computational effort for determining the trajectory.

SUMMARY

The object of the present disclosure is therefore to provide a method of the type in question for controlling a vehicle, in which trajectory planning is improved in a simple and cost-effective manner.

The aforementioned object is addressed by the teaching of claim 1 and the other independent claims. Expedient embodiments of the invention are claimed in the dependent claims.

In the method according to the present disclosure for controlling a vehicle along a trajectory, the vehicle includes at least one actuator, preferably a plurality of actuators. Furthermore, the vehicle includes a control device which has a trajectory planner which plans the trajectory within a definable search space, taking into account a projection or prediction of at least one manipulated variable of the actuator or controller. In particular, the method is suitable for planning trajectories in the longitudinal direction (longitudinal trajectory planning). The method includes the following method steps:
- creating an actuator model of the actuator on the basis of the at least one manipulated variable of the actuator,
- defining time increments of the projection,
- determining the change in the manipulated variable of the actuator along the time increments on the basis of the actuator model and a limit value of the manipulated variable,
- limiting the search space on the basis of the limit value of the manipulated variable of the actuator,
- determining an acceleration value and/or a deceleration value of the vehicle by converting the at least one manipulated variable using the vehicle mass and the wheel radius, and
- outputting the acceleration value and the deceleration value to limit the search space within which the trajectory is planned or the trajectory planner searches for a possible trajectory.

The advantage of the method sequence according to the present disclosure is that it is ensured that only drivable trajectories are planned by the trajectory planner, by also taking into account natural limits on the actuators. In a particularly simple way, the invention allows a variable projection of the manipulated variable(s), meaning that the methodology may also be used for multiple actuators and a complex vehicle model is not required. Furthermore, the method requires only simple parameterization and, due to an analytical calculation, only a small amount of computational effort. In addition, the method is compatible with different planning concepts and may thus be implemented in a particularly simple and flexible manner.

Preferably, the actuator is an engine, e.g., an internal combustion engine or electric engine, and/or a brake of the vehicle. However, alternatively or additionally, one of the actuators may also be the steering system.

According to a preferred embodiment of the present disclosure, the manipulated variable is a torque, in particular an engine torque of the engine or a braking torque of the brake.

Advantageously, the limit value may be the maximum possible change in the manipulated variable in the positive and/or negative direction. For example, the manipulated variable may be a torque of an engine.

Expediently, the actuator model may be based on a function of the manipulated variable, which, plotted against time, may have a positive gradient of the manipulated variable for manipulated variable build-up and a negative gradient of the manipulated variable for manipulated variable reduction. For example, the actuator model or actuator models may be an engine model and/or brake model. If the manipulated variable is the engine torque or the braking torque, the engine model includes, for example, an engine torque build-up as a positive gradient and an engine torque reduction as a negative gradient, and the brake model preferably includes a braking torque build-up as a positive gradient and a braking torque reduction as a negative gradient. In a practical manner, the particular gradient may be determined by considering the time increments of the projection for the time axis.

Preferably, the acceleration value is the maximum possible acceleration of the vehicle, and the deceleration value is the maximum possible deceleration of the vehicle.

According to an embodiment of the method, the driving resistance may be determined. In particular, this may be determined from the time increments of the projection or the duration of the projection.

Expediently, the driving resistance may also be taken into account when determining the acceleration value and/or the deceleration value. This further increases the determination reliability.

Furthermore, at least one sensor for detecting the environment may be provided, in particular a camera and/or a lidar sensor and/or a radar sensor and/or an ultrasonic sensor. On the basis of the sensor data from the sensor or sensors, the vehicle environment and objects and road users located therein may be detected. The sensor data from several sensors may also be merged to further improve the detection of the environment and objects.

In a practical manner, the detected vehicle environment including objects and road users located therein may be used to define the search space and/or for trajectory planning. This may be done, for example, by further narrowing down the search space for possible trajectories, since objects detected by the sensors are located in the previously limited search space. Furthermore, the trajectory to be driven may be selected during or after trajectory planning in such a way that, for example, collision-avoidance aspects are taken into account by selecting a trajectory that extends along the course of the road and without colliding with other objects/road users.

Furthermore, example embodiments may include a computer program comprising program code for carrying out the method according to the present disclosure when the computer program is executed on a computer or another programmable data processor known from the prior art. Thus, the method may also be configured as a purely computer-implemented method; within the meaning of the invention, the term "computer-implemented method" describes a sequence plan or procedure which is implemented or carried out using a data processor. The data processor, such as a computer, a computer network or another programmable device known from the prior art (e.g. a computing device comprising a processor, microcontroller or the like), may process data by means of programmable calculation specifications.

In addition, the example embodiments may include a computer-readable storage medium which has instructions which cause the computer on which the instructions are executed to carry out a method.

Additionally or secondarily, the example embodiments may also include a control device for controlling a vehicle along a trajectory, in particular in the longitudinal direction, the control device being configured in such a way that the vehicle is controlled on the basis of the method.

Within the meaning of the invention, the expression "search space" is understood to mean the spatial extent within which the control unit searches for possible drivable trajectories, it being possible to plan multiple trajectories within the search space in order to then select the particular trajectory appropriate to the situation.

Within the meaning of the invention, the term "limit value" is understood to mean a maximum or minimum value of the manipulated variable, i.e. a maximum or minimum with a progression that may be recorded, for example, along the distance covered or the time t.

The invention also expressly includes combinations of features or claims, or "sub-combinations", that are not explicitly indicated.

BRIEF DESCRIPTION OF THE DRAWINGS

The invention is described in more detail below with reference to expedient exemplary embodiments. In the drawings.

DETAILED DESCRIPTION

Figure 1:
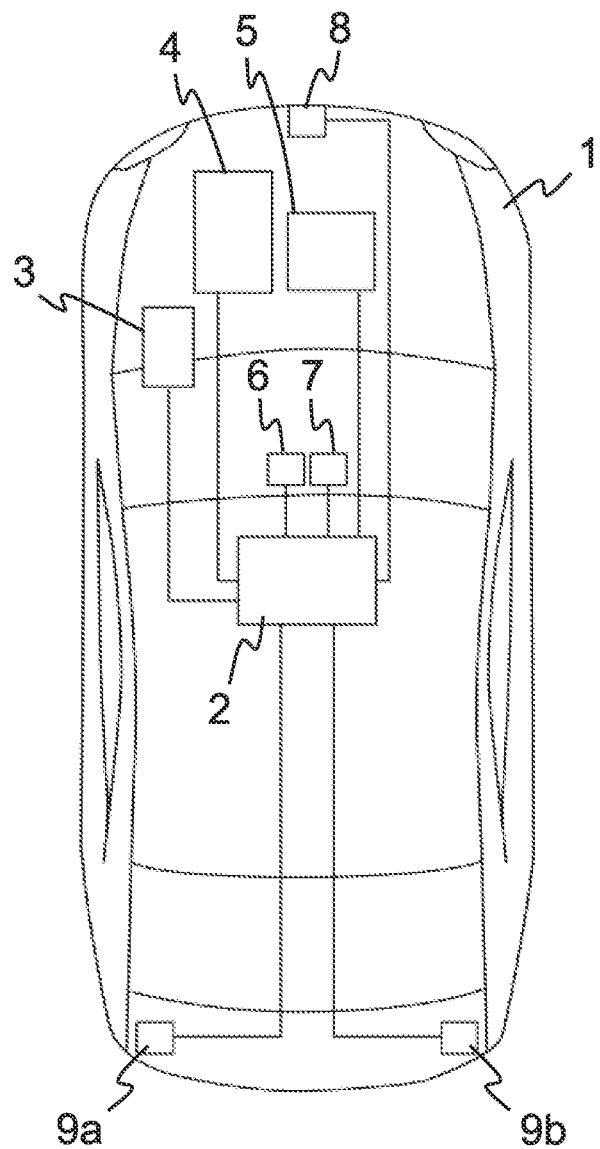
FIG. 1 is a simplified schematic view of a vehicle in which a maximum manipulated variable is predicted using the method according to the invention.

Reference sign 1 in FIG. 1 refers to a vehicle having various actuators (steering system 3, engine 4, brake 5), the vehicle having a control device 2 (ECU, Electronic Control Unit) by means of which trajectory planning may be performed with respect to the actuator dynamics. The trajectory is calculated on the basis of a trajectory planner, wherein a prediction of a maximum manipulated variable of the particular actuator is made, in particular in the longitudinal direction, to limit the search space of the trajectory planner and is used for trajectory planning. The trajectory planner may be configured as a hardware module of the control device 2 or merely as a software module. Furthermore, the vehicle 1 has sensors for detecting the environment (camera 6, lidar sensor 7, radar sensor 8 and ultrasonic sensors 9a, 9b), the sensor data from which is used for detecting the environment and objects such that various assistance functions may be implemented, such as an emergency brake assistance system (EBA, Electronic Brake Assist), distance following control (ACC, Automatic Cruise Control), lane-keeping control or a lane keep assistance system (LKA, Lane Keep Assist), or the like. In a practical manner, the assistance functions may also be carried out by means of the control device 2 or a separate control device.

The method according to the present disclosure uses the input signals of vehicle acceleration a, vehicle speed v, braking torque $T_B$, engine torque $T_M$, engine torque minimum $T_{M,min}$, engine torque maximum $T_{M,max}$ and the currently engaged gear and provides the two output vectors of maximum acceleration and maximum deceleration, each having a variable projection. The vehicle parameters of transmission ratio $i_g$, vehicle mass m, wheel radius r, front area A, drag coefficient $c_W$ (with decreasing accuracy requirements in this order) and air density $\rho_L$ (in kg/m$^3$) are known. A simplified structure of a flow chart and of the data flow of the method is shown in FIG. 2.

Figure 2:
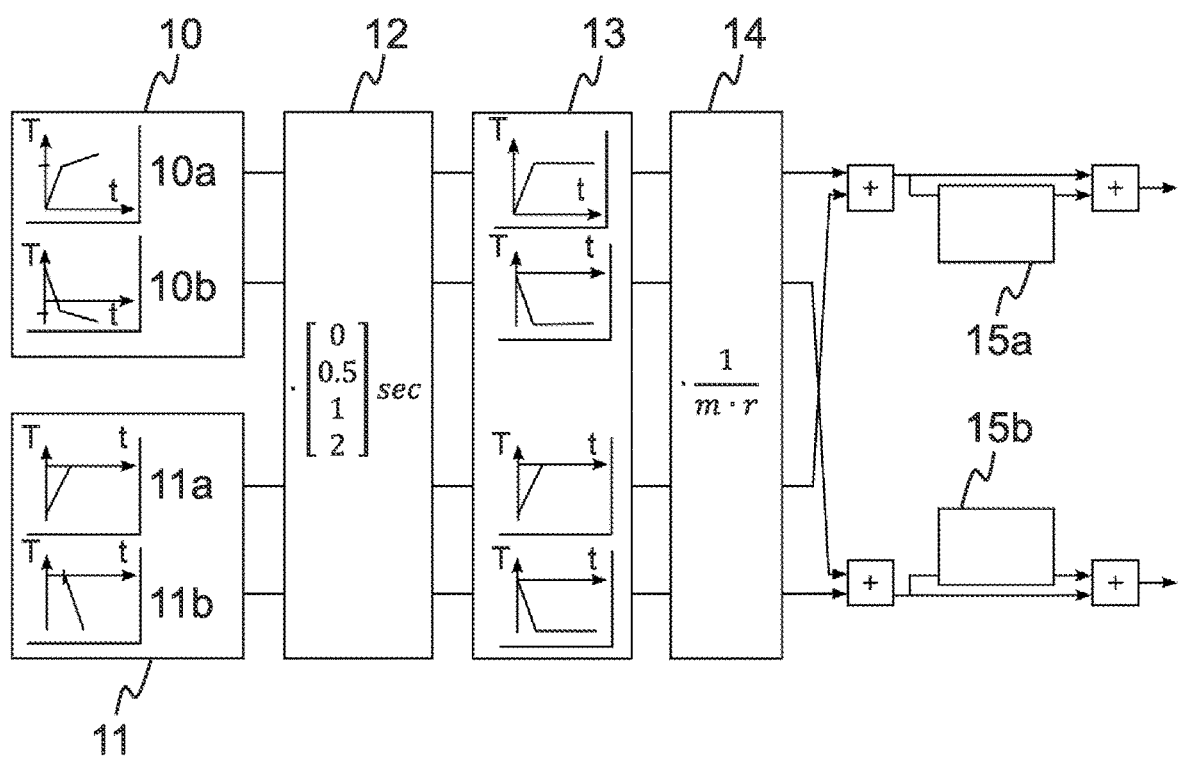
FIG. 2 is a simplified schematic view of a sequence of the method according to the invention.

In FIG. 2, as examples, the actuators are the brake and the engine, which are represented by respective associated actuator models (engine model 10 and brake model 11), each of which each exhibits a positive gradient of the torque T for torque build-up (engine torque build-up 10a and braking torque build-up 11a) and a negative gradient of the torque T for torque reduction (engine torque reduction 10b and braking torque reduction 11b) with respect to time t. In FIG. 2, the torque T is indicated in Newton meters (Nm) and the time is indicated in seconds (s). The brake is represented by a linear function with dead time and saturation; the dead time to be optionally included having the first slope section and the saturation includes the second slope section of the function. The engine in the engine model 10 is represented as a piecewise-defined linear function with optional dead time and saturation, since, for example, internal combustion engines and electric engines, due to their design, provide a lower torque gradient above a gear-dependent engine torque limit value than below the engine torque limit value. By contrast, for an electric engine with a single-gear transmission, modeling may be selected as in the brake model 11.

As part of the projection 12, the maximum rising and falling gradients of the actuators are each multiplied by the vector of the projection in order to determine the maximum positive and negative change of the torque T in the time increments (time t in seconds s) indicated by the vector. According to FIG. 2, the following time increments were selected: 0 s, 0.5 s, 1 s and 2 s.

Furthermore, the maximum torque change plus the current torque T cannot exceed the absolute limit of the particular actuator (i.e., for example, engine torque maximum $T_{M,max}$) and is therefore limited to the possible operating range of the actuator, as shown by the saturation 13.

Subsequently, a conversion 14 is expediently carried out, in which the (four) torque changes are converted into (four) vehicle accelerations on the basis of $$a = T \cdot (m \cdot r)$$

using the vehicle mass m and the wheel radius r. The converted sum of engine torque build-up and braking torque reduction then gives the maximum vehicle acceleration. Accordingly, the converted sum of engine torque reduction and braking torque build-up gives the maximum vehicle deceleration.

In addition, the driving resistance is taken into account for the determined vehicle deceleration. The calculated vehicle acceleration is applied to produce a change in driving resistance over the duration of the projection. This also causes a change in the acceleration. The change in driving resistance 15a, 15b may be taken into account by applying the following:

$$a_{res} = \frac{1}{2} \cdot c_w \cdot A \cdot \rho_L \cdot v_{diff}^2$$

At the output (right arrow), the acceleration and deceleration limits corrected by the influence of the change in driving resistance are then both displayed or outputted with the projection, e.g., 0 s, 0.5 s, 1 s, 2 s or the like (variable), and transmitted to the planner.

In summary, the example embodiments are able to provide a prediction method for estimating the current and future actuator limits, in particular in the longitudinal direction. These actuator limits are to be made available to the planner in order to calculate trajectories that may be driven. In particular, the available dynamics and the absolute limits of the engine and brake as actuators are to be estimated. In addition, driving resistance is also to be taken into account. The estimated actuator limits may be calculated for the current point in time and for a temporal projection which is based on the planner. Furthermore, the estimated actuator limits may be transmitted to the planner in the form of longitudinal vehicle accelerations in order to achieve compatibility with optimization-based and non-optimization-based planning approaches. Furthermore, the present invention may also be adapted to over-actuated systems, e.g., vehicles with a front and rear axle steering system or all-wheel drive vehicles, i.e., may be extended to include additional longitudinal actuators. In addition, an application to redundant actuators is possible, e.g. a "brake-by-wire brake" with a conventional brake as a fallback path. Furthermore, the method is not limited to control in the longitudinal direction, but may also be applied to "steer-by-braking" methods. Moreover, the method may be applied both to planner concepts and controller approaches and to combined approaches such as model predictive control (MPC).

LIST OF REFERENCE NUMERALS

1 Vehicle
2 Control device
3 Steering system
4 Engine
5 Brake
6 Camera
7 Lidar sensor
8 Radar sensor
9a Ultrasonic sensor
9b Ultrasonic sensor
10 Engine model
10a Engine torque build-up
10b Engine torque reduction
11 Brake model
11a Braking torque build-up
11b Braking torque reduction
12 Projection
13 Saturation
14 Conversion
15a Driving resistance
15b Driving resistance
A Front area
a Vehicle acceleration
$c_W$ Drag coefficient
$i_G$ Transmission ratios
m Vehicle mass
r Wheel radius
T Torque
t Time
v Vehicle speed
$\rho_L$ Air density

The invention claimed is:

1. A method for controlling a vehicle comprising at least one actuator along a trajectory, in which the trajectory is planned within a search space, taking into account a projection of at least one manipulated variable of the actuator, the method comprising:
creating an actuator model of the actuator on the basis of the at least one manipulated variable of the actuator,
defining time increments of the projection,
determining a change in the at least one manipulated variable of the actuator along the time increments on the basis of the actuator model and a limit value for the at least one manipulated variable,
limiting a search space on the basis of the limit value of the at least one manipulated variable of the actuator,
determining at least one of an acceleration value or a deceleration value of the vehicle by converting the at least one manipulated variable using vehicle mass and wheel radius,
outputting the at least one of the acceleration value or the deceleration value to limit the search space within which the trajectory is planned, the planned trajectory being based at least in part upon the at least one of the acceleration value of the deceleration value, and
controlling the vehicle along the planned trajectory,
wherein a change in driving resistance is determined over the time increments of the projection, and
wherein the change in driving resistance is additionally taken into account when determining the at least one of the acceleration value or the deceleration value.

2. The method according to claim 1, wherein the actuator is at least one of an engine or a brake of the vehicle.

3. The method according to claim 2, wherein the manipulated variable is a torque, in particular an engine torque of the engine or a braking torque of the brake.

4. The method according to claim 1, wherein the limit value is a maximum possible change in the manipulated variable in at least one of a positive or negative direction.

5. The method according to claim 1, wherein the actuator model is based on a function of the manipulated variable and includes a positive gradient of the manipulated variable for manipulated variable build-up and a negative gradient of the manipulated variable for manipulated variable reduction with respect to time t.

6. The method according to claim 1, wherein the acceleration value is a maximum possible acceleration of the vehicle, and the deceleration value is a maximum possible deceleration of the vehicle.

7. The method according to claim 1, further comprising providing at least one sensor for detecting the surroundings.

8. The method according to claim 7, wherein the detected surroundings are used to define at least one of the search space or trajectory planning.

9. The method according to claim 7, wherein the at least one sensor comprises at least one of a camera, a Lidar sensor, a radar sensor or an ultrasonic sensor.

10. A computer program comprising program code for carrying out the method according to claim 1, wherein the computer program is executed on a computer.

11. A computer-readable storage medium comprising instructions that cause a computer on which the instructions are executed to carry out the method according to claim 1.

12. A control device for controlling a vehicle along a trajectory, wherein
the control device comprises a hardware processor and program code maintained in non-transitory memory which, when executed by the hardware processor, causes the hardware processor to control the vehicle by the method according to claim 1.

13. A computer program product maintained in non-transitory memory and having instructions which, when executed by a computer processor, causes the computer processor to perform operations including at least partly controlling a vehicle having at least one actuator along a trajectory, the operations comprising:
   creating an actuator model of the actuator on the basis of at least one manipulated variable of the actuator,
   defining time increments of a projection of the at least one manipulated variable of the actuator,
   determining a change in the at least one manipulated variable of the actuator along the time increments on the basis of the actuator model and a limit value for the at least one manipulated variable,
   limiting a search space on the basis of the limit value of the at least one manipulated variable of the actuator,
   determining at least one of an acceleration value or a deceleration value of the vehicle by converting the at least one manipulated variable using vehicle mass and wheel radius,
   outputting the at least one of the acceleration value or the deceleration value to limit the search space within which the trajectory is planned, the planned trajectory being based at least in part upon the at least one of the acceleration value or the deceleration value, and
   controlling the vehicle along the planned trajectory,
   wherein a change in driving resistance is determined from the time increments of the projection, and
   wherein the change in driving resistance is additionally taken into account when determining the at least one of the acceleration value or the deceleration value.

14. The computer program product according to claim 13, wherein the actuator is at least one of an engine or a brake of the vehicle, and wherein the manipulated variable is a torque of the engine or a braking torque of the brake.

15. The computer program product according to claim 13, wherein the actuator model is based on a function of the manipulated variable and includes a positive gradient of the manipulated variable for manipulated variable build-up and a negative gradient of the manipulated variable for manipulated variable reduction with respect to time t.

16. The computer program product according to claim 13, wherein the acceleration value is a maximum possible acceleration of the vehicle, and the deceleration value is a maximum possible deceleration of the vehicle.

17. A control device comprising a computer processor which, when executing instructions, is configured to perform operations including at least partly controlling a vehicle having at least one actuator along a trajectory, the operations comprising:
   creating an actuator model of the actuator on the basis of at least one manipulated variable of the actuator,
   defining time increments of a projection of the at least one manipulated variable of the actuator,
   determining a change in the at least one manipulated variable of the actuator along the time increments on the basis of the actuator model and a limit value for the at least one manipulated variable,
   limiting a search space on the basis of the limit value of the at least one manipulated variable of the actuator,
   determining at least one of an acceleration value or a deceleration value of the vehicle by converting the at least one manipulated variable using vehicle mass and wheel radius, wherein the planned trajectory being based at least in part upon the at least one of the acceleration value or the deceleration value,
   planning the trajectory within the search space based at least in part upon the at least one of the acceleration value or the deceleration value, and
   controlling the vehicle along the planned trajectory,
   wherein a change in driving resistance is determined from the time increments of the projection, and
   wherein the change in driving resistance is additionally taken into account when determining the at least one of the acceleration value or the deceleration value.

18. The control device according to claim 17, wherein the actuator is at least one of an engine or a brake of the vehicle, and wherein the manipulated variable is at least one of torque of the engine or a braking torque of the brake of the vehicle.

* * * * *